United States Patent
Dell'Aversana et al.

(10) Patent No.: US 11,268,374 B2
(45) Date of Patent: Mar. 8, 2022

(54) MONITORING AND MAPPING SYSTEM OF THE SPACE-TIME DISTRIBUTION OF FORMATION FLUIDS IN A RESERVOIR AND A COMPLETION AND PRODUCTION PLANT OF A WELL FOR THE EXTRACTION OF FORMATION FLUIDS

(71) Applicant: ENI S.P.A., Rome (IT)

(72) Inventors: Paolo Dell'Aversana, Salsomaggiore Terme (IT); Franco Bottazzi, Piacenza (IT); Claudio Molaschi, Crema (IT); Carlo Carniani, Pantigliate (IT); Germana Gallino, San Donato Milanese (IT); Raffaele Servodio, San Donato Milanese (IT)

(73) Assignee: ENI S.P.A., Rome (IT)

( * ) Notice: Subject to any disclaimer, the term of this patent is extended or adjusted under 35 U.S.C. 154(b) by 32 days.

(21) Appl. No.: 16/648,547

(22) PCT Filed: Sep. 21, 2018

(86) PCT No.: PCT/IB2018/057305
§ 371 (c)(1),
(2) Date: Mar. 18, 2020

(87) PCT Pub. No.: WO2019/058322
PCT Pub. Date: Mar. 28, 2019

(65) Prior Publication Data
US 2020/0217188 A1     Jul. 9, 2020

(30) Foreign Application Priority Data

Sep. 22, 2017   (IT) ........................ 102017000106233

(51) Int. Cl.
*E21B 47/10*     (2012.01)
*E21B 47/01*     (2012.01)
(Continued)

(52) U.S. Cl.
CPC .............. *E21B 47/10* (2013.01); *E21B 47/01* (2013.01); *G01V 3/26* (2013.01); *G01V 3/30* (2013.01);
(Continued)

(58) Field of Classification Search
CPC .......... E21B 47/10; E21B 47/01; E21B 47/12; E21B 47/138; E21B 47/113;
(Continued)

(56) References Cited

U.S. PATENT DOCUMENTS

| 4,662,218 A | 5/1987 | Hawthorne |
| 6,611,762 B1 * | 8/2003 | Gao ..................... G09B 29/005 702/7 |

(Continued)

FOREIGN PATENT DOCUMENTS

| WO | WO 2015/167935 A1 | 11/2015 |
| WO | WO 2017/014773 A1 | 1/2017 |
| WO | WO 2017/160868 A2 | 9/2017 |

OTHER PUBLICATIONS

International Search Report dated Jan. 2, 2019 in PCT/IB2018/057305 filed Sep. 21, 2018.
(Continued)

*Primary Examiner* — George S Gray
(74) *Attorney, Agent, or Firm* — Oblon, McClelland, Maier & Neustadt, L.L.P.

(57) ABSTRACT

A monitoring and mapping system, including: at least four transceiver devices arranged to be applied at a predefined mutual distance along a casing pipe, each of the transceiver devices including: a tubular body arranged to be fit on the casing pipe, the tubular body having at a first end a first longitudinal portion, at a second end a second longitudinal portion and a third longitudinal portion interposed between the first and second longitudinal portions; a coil wound on
(Continued)

the first longitudinal portion; a layer of elastomeric material which winds the third longitudinal portion; an electrode wound on the layer of elastomeric material; and a peripheral electronic control unit associated with the tubular body; the monitoring and mapping system further including a central electronic control and data acquisition unit configured to drive the peripheral electronic control units so as to selectively power the electrodes and the coils.

14 Claims, 4 Drawing Sheets

(51) Int. Cl.
  *G01V 3/26* (2006.01)
  *G01V 3/30* (2006.01)
  *E21B 49/08* (2006.01)
  *E21B 43/14* (2006.01)
  *E21B 47/12* (2012.01)
  *G01V 3/28* (2006.01)
(52) U.S. Cl.
  CPC ............... *E21B 43/14* (2013.01); *E21B 47/12* (2013.01); *E21B 49/0875* (2020.05); *G01V 3/28* (2013.01)

(58) Field of Classification Search
  CPC .. E21B 47/114; E21B 47/013; E21B 49/0875; E21B 49/087; E21B 43/14; G01V 3/28; G01V 3/26; G01V 3/30
  See application file for complete search history.

(56) References Cited

U.S. PATENT DOCUMENTS

| | | |
|---|---|---|
| 6,859,733 B1 | 2/2005 | Gao |
| 2006/0005965 A1 | 1/2006 | Chouzenoux et al. |
| 2006/0119363 A1 | 6/2006 | Ligneul et al. |
| 2007/0151724 A1* | 7/2007 | Ohmer ................ E21B 33/1208 166/187 |
| 2011/0061862 A1 | 3/2011 | Loretz et al. |
| 2014/0191120 A1* | 7/2014 | Donderici ................ G01V 3/34 250/265 |
| 2019/0162064 A1* | 5/2019 | Donderici ............. E21B 17/003 |
| 2020/0257014 A1* | 8/2020 | Khalaj Amineh ....... G01V 3/30 |

OTHER PUBLICATIONS

Office Action dated Mar. 16, 2021 in corresponding European Patent Application No. 18 788 890.4, 7 pages.

* cited by examiner

MONITORING AND MAPPING SYSTEM OF THE SPACE-TIME DISTRIBUTION OF FORMATION FLUIDS IN A RESERVOIR AND A COMPLETION AND PRODUCTION PLANT OF A WELL FOR THE EXTRACTION OF FORMATION FLUIDS The present invention relates to a monitoring and mapping system of the space-time distribution of formation fluids in a reservoir, particularly but not exclusively applicable to production, injection and storage oil wells irrespective of the characteristics of the reservoir and of the type of completion technology used, i.e. the so-called "open hole" or "cased hole" technology.

The monitoring system object of the present invention is, by way of example, advantageously usable in case of wells that present the risk of invasion phenomena by undesired fluids such as water and/or gases consequent to the hydrocarbon production operations. This risk is present above all in the case of movement of the oil-water, gas-water and/or gas-oil interface.

The present invention also relates to a completion and production plant comprising the aforesaid monitoring system.

Currently, different monitoring systems are known, based on seismic survey methods, or on 4D gravimetry, or on the detections of well-bottom sensors, or on the tracer technology, or on electromagnetic survey methods.

In general, electromagnetic survey methods are based on the use of detection systems that include transmitters and receivers of electromagnetic signals. In detail, an alternating electric current with predetermined frequency and intensity is made to pass through the transmitters, thereby creating a primary electromagnetic field that propagates in the formation. Said primary field, in turn, induces, within conductive formations, secondary currents that generate a secondary electromagnetic field that is detected by the receiver and whose amplitude and phase depend on the electrical conductivity of the medium in which it propagates.

The electrical resistivity (inverse of conductivity) of the rock formation, on the other hand, depends on various factors such as the degree of saturation, the salinity of the water present in the geological formations, the mineralogical composition and so on.

Therefore, from the detection of a secondary electromagnetic field it is possible to obtain a measurement of electrical resistivity of the various layers that compose the rock formation and thus information about the composition thereof and of the fluids contained therein.

Considering that hydrocarbons are far less conductive and thus more resistive than normal sedimentary rock, impregnated with water, electromagnetic survey methods make it possible to localise a hydrocarbon reservoir and to provide a guide for drilling and for monitoring flows around the extraction well.

As is well known, transmitters comprise controlled galvanic or inductive electromagnetic sources, such as linear electric dipoles or magnetic loops, while receivers can be electric and/or magnetic, for example a magnetometer.

The electromagnetic survey methods known today comprise different types of detection systems.

In particular, detection systems of a first type, commonly known as "surface-to-borehole", have transmitters located in the surface and receivers situated in the well at a variable depth.

In this case, there is no restriction on the dimensions of the transmitter and hence on the intensity of the electromagnetic field generated by the latter. Hence, it is possible to transmit high intensity electromagnetic fields able to propagate in depth in the geological formation.

However, the propagation of the electromagnetic field inside the geological formation is usually accompanied by high attenuation, so that it is not possible to obtain accurate measurements relating to areas that are very deep and far from the receiver.

Detection systems of a second type, commonly known as "borehole-to-surface", have transmitters located in the well and receivers positioned on the surface.

In the limited space of the well, it is not possible to install transmitters of large dimensions and this does not allow to generate an electromagnetic field of such intensity as to be detected on the surface, after it propagates through the geological formation.

In these conditions, to assure that the electromagnetic field generated can propagate in the subsoil and be detected in the surface, without being confused with a noise signal, it is then necessary to generate low frequency electromagnetic fields, which obviously impose a low spatial resolution of the measurement of electrical conductivity. It is not possible to obtain, by means of detection systems of the second type, measurements with good spatial resolution, in a wide area around the well.

Detection systems of a third type, commonly known as "single well borehole", have transmitters and receivers situated inside the same well.

In this case, conductivity measurements with high spatial resolution can be performed only for the rock formations immediately close to the well, inasmuch as it is not possible to generate high intensity electromagnetic fields because of the limited space in which the transmitter is installed and by effect of the mutual inductance that is established between transmitters and receivers.

Detection systems of a fourth type, commonly called "borehole-to-borehole" or "cross-well", have transmitters and receivers positioned in two or more wells to obtain resistivity models of the space between the wells. However, detection systems of the fourth type can only be applied in the cases in which the two wells are appropriately spaced The detection systems mentioned hitherto do not allow to perform real-time measurements during the drilling of the well, inasmuch as they depend on the operation of at least one device positioned inside the well itself. It is therefore necessary to suspend the well's production to be able to perform the measurements.

The purpose of the present invention is to overcome the aforementioned drawbacks and in particular to devise a monitoring system of a reservoir able to perform distribution measurements of electromagnetic fields in the reservoir continuously, in real time during the production of the well, with a wide survey radius and high resolution.

This and other purposes according to the present invention are achieved providing a monitoring and mapping system of the space-time distribution of formation fluids in a reservoir and a completion and production plant of a well for the extraction of formation fluids as set forth in the independent claims.

Further features of the monitoring and mapping system of the space-time distribution of formation fluids in a reservoir and of the completion and production plant of a well for the extraction of formation fluids are set forth in the dependent claims.

The features and the advantages of a monitoring and mapping system of the space-time distribution of formation fluids in a reservoir and a completion and production plant of a well for the extraction of formation fluids according to the present invention will become more readily apparent from the following exemplifying and non-limiting description, referred to the accompanying schematic drawings in which:

FIG. 5b is a sectioned schematic view of the tubular protection shell of FIG. 5a;

With reference to the figures, a completion and production plant 10 of a well for the extraction of formation fluids 20 from a reservoir 30 is shown.

Figure 1:
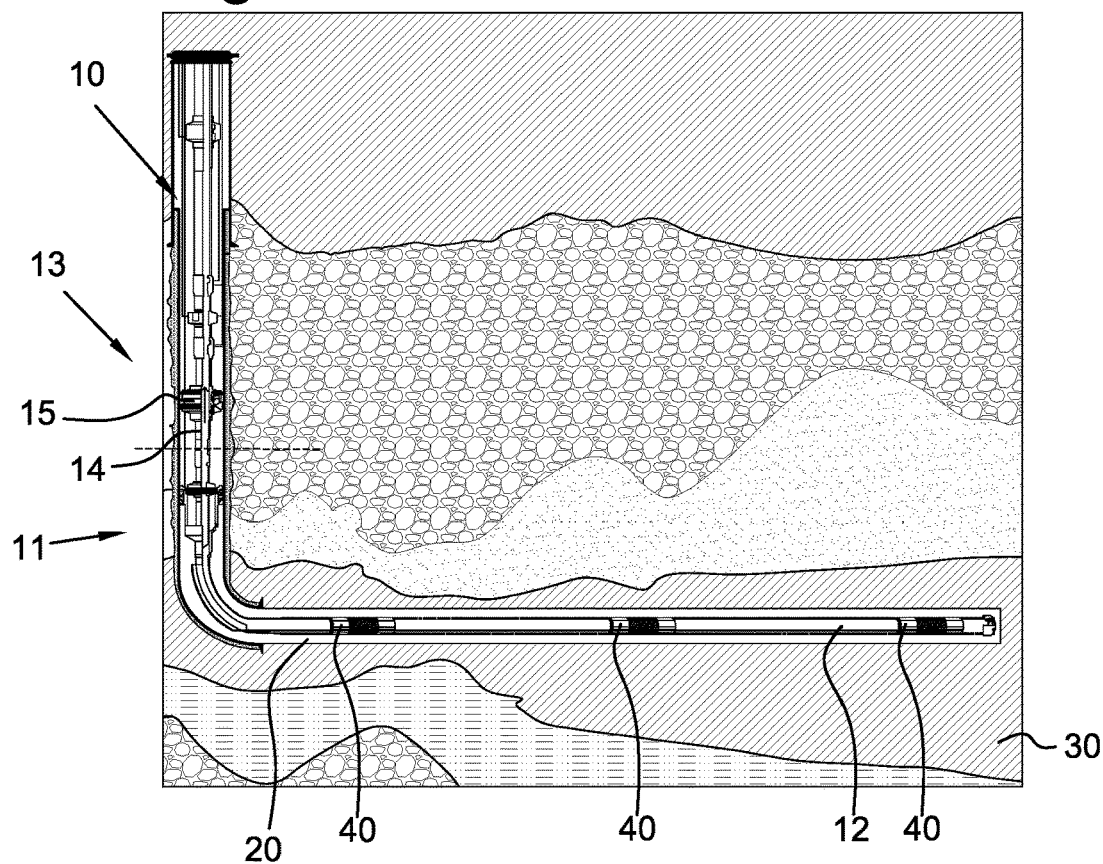
FIG. 1 is a schematic view of a well for the extraction of formation fluids with a completion and production plant according to a first embodiment of the present invention.
Figure 2:
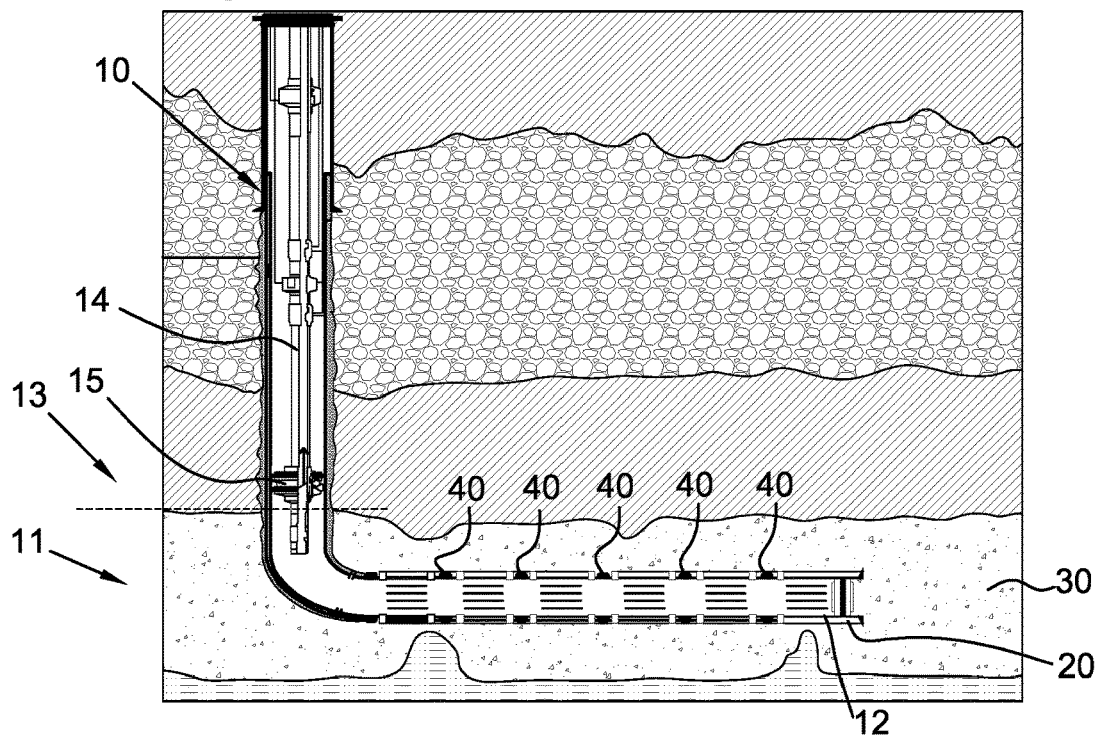
FIG. 2 is a schematic view of a well for the extraction of formation fluids with a completion and production plant in accordance with a second embodiment of the present invention.

Hereafter, reference will be made, by way of non-limiting example, to the case of a horizontal well as shown in FIG. 1. However, the plant 10 according to the present invention can be applied to any well also, for example, to a vertical well.

The completion and production plant 10 comprises a lower section 11, also commonly called "lower completion", which extends at least partially in the reservoir 30 and an upper section 13, also commonly called "upper completion", which extends superiorly to the lower section 11 to the surface.

In any case, the completion and production plant 10 comprises a primary conveyor pipe 12 which faces and at least partially extends into the reservoir 30 to convey the formation fluids towards the upper section 13 and a production pipe 14 arranged to bring to the surface the formation fluids brought to the upper section 13.

The completion and production plant 10 according to the present invention can be of the Open Hole type or of the cased hardened hole type (Cased Hole).

In the first case, the primary conveyor pipe 12 extends substantially only in the lower section 11 and couples in a per se known manner to the production pipes 14 lying in the upper section 13.

In the second case, the primary conveyor pipe 12 also operates as a casing of the well 20 and extends substantially along the entire well and the production pipes 14 extend internally to said pipe 12.

If the completion and production plant is of the open hole type, the primary conveyor pipe 12 can, for example, be of the windowed type, i.e. it has a plurality of openings in order to allow the inflow of formation fluids inside the pipe itself so that the formation fluids are conveyed to the upper section 13 of the completion and production plant 10.

The completion and production plant 10 is provided with a well-insulation device 15, commonly known also as "isolation packer" arranged between the upper section 13 and the lower section 11. Said well-insulation device 15 is able, when it is activated, to provide a sealing separator baffles that isolates the upper section 13 from the lower section 11 in case of accidental inflow of the formation fluids, for example in case of risks of blow-out phenomena.

The well-insulation device 15 is, in particular, a hydraulic and mechanical sealing element for axial loads, recoverable or permanent which isolates the environment invaded by the formation fluid with the upper section conveying the formation fluid into the production tubing.

During the completion operations, i.e. during the installation of the plant 10, the so-called completion fluids, per se known in the prior art and adapted to prevent undesired and uncontrolled intrusions of formation fluids are injected into the well. Upon completion of the installation of the devices (for example the isolation packers) adapted to create a primary protection barrier against the aforementioned accidental inflows of formation fluids, completion fluids are displaced in such a way that they are present only in the upper section 13.

According to the present invention, the completion and production plant 10 comprises a monitoring and mapping system of the space-time distribution of formation fluids in the reservoir which will be described below. This monitoring and mapping system comprises at least four transceiver devices 40 applied to a predefined distance from each other along the primary conveyor pipe 12. For example, the transceiver devices 40 can be placed at a mutual distance of approximately 5 m.

Each of the transceiver devices 40 comprises a tubular body 41 arranged to be fitted on the primary conveyor pipe 12; the tubular body 41 has a first longitudinal portion 42 at a first end, a second longitudinal portion 43 at a second end opposite to said first end, and a third longitudinal portion 44 interposed between the first 42 and second 43 longitudinal portions.

The tubular body 41 can be made, for example, of glass fibre or carbon fibre and has a greater diameter than that of the primary conveyor pipe 12, for example approximately 3 mm greater than that of the primary conveyor pipe 12.

The transceiver device 40 further comprises a coil 45 wound on the first longitudinal portion 42 adapted to operate as a magnetic field source when it is electrically powered and as a magnetic field receiver when it is not electrically powered.

Figure 3A:
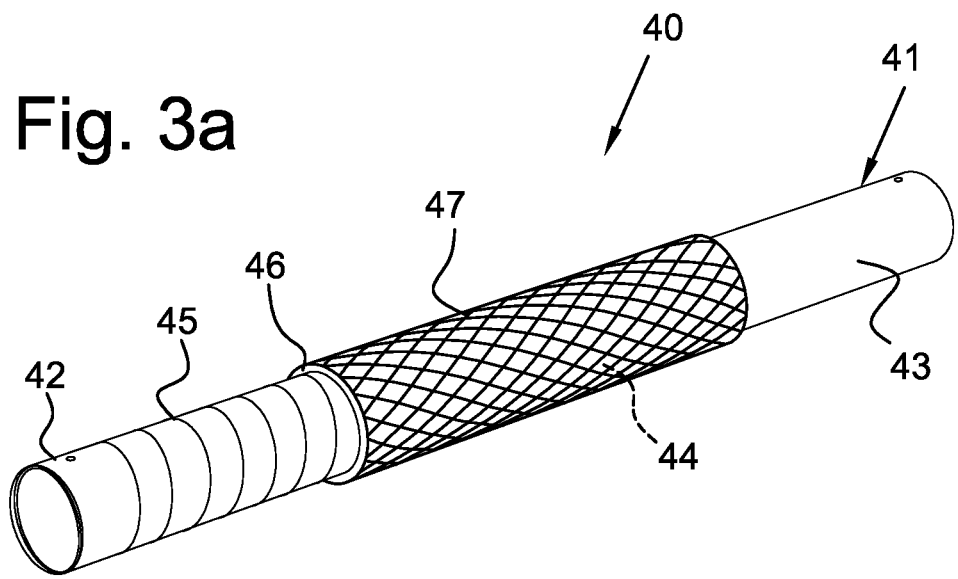
FIG. 3a is a perspective schematic view of a partially assembled detection device of a monitoring system according to the present invention.
Figure 3B:
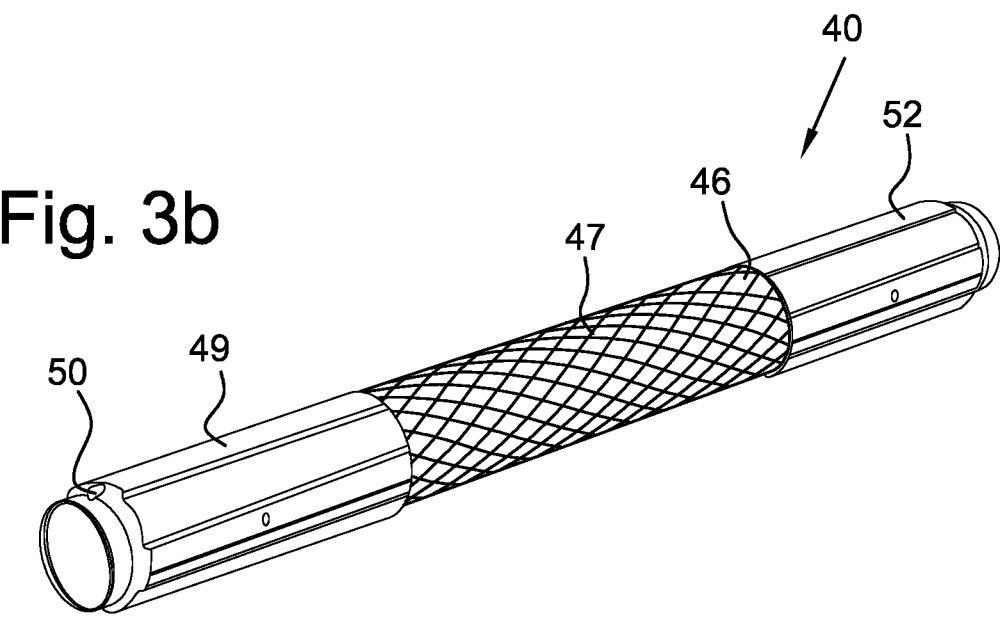
FIG. 3b is a perspective schematic view of the transceiver device of FIG. 3a upon completion of the assembly.
Figure 4:
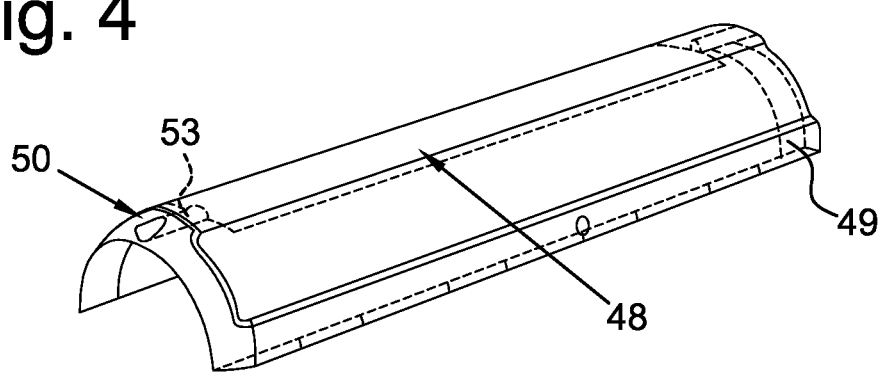
FIG. 4 is a partial perspective schematic view of a tubular stopping shell of the detection device of FIG. 3b.
Figure 5A:
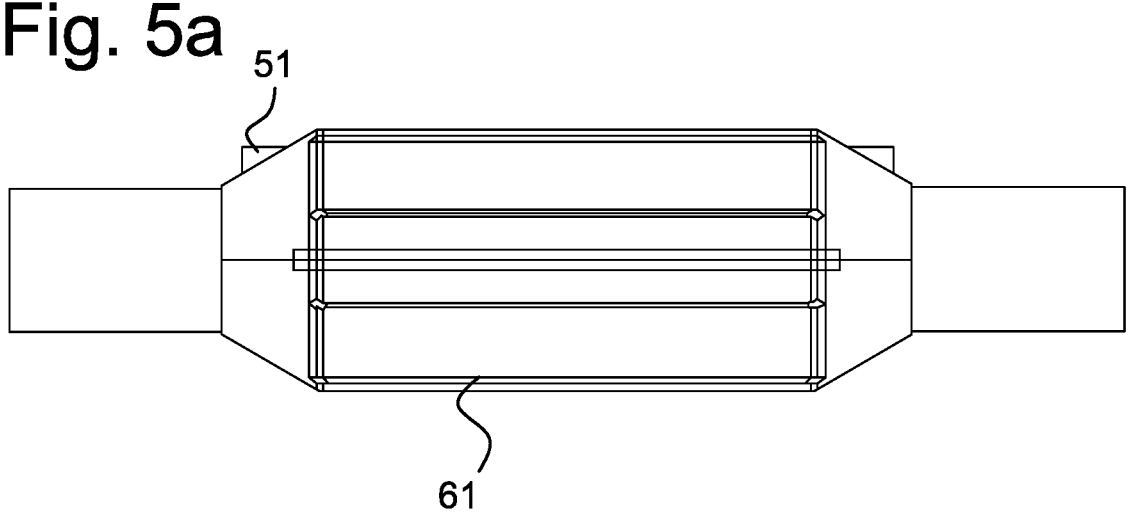
FIG. 5a is a schematic view of a tubular protection shell of the monitoring and mapping system of the space-time distribution of formation fluids in a reservoir according to the present invention applied to a pipe.
Figure 5B:
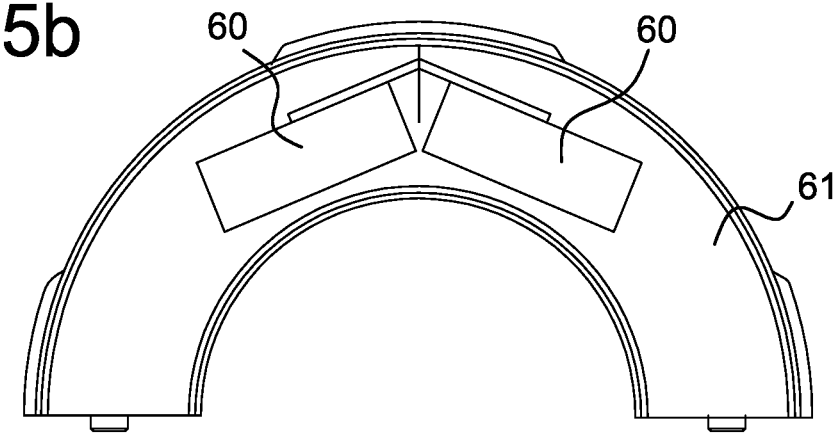
Figure 6:
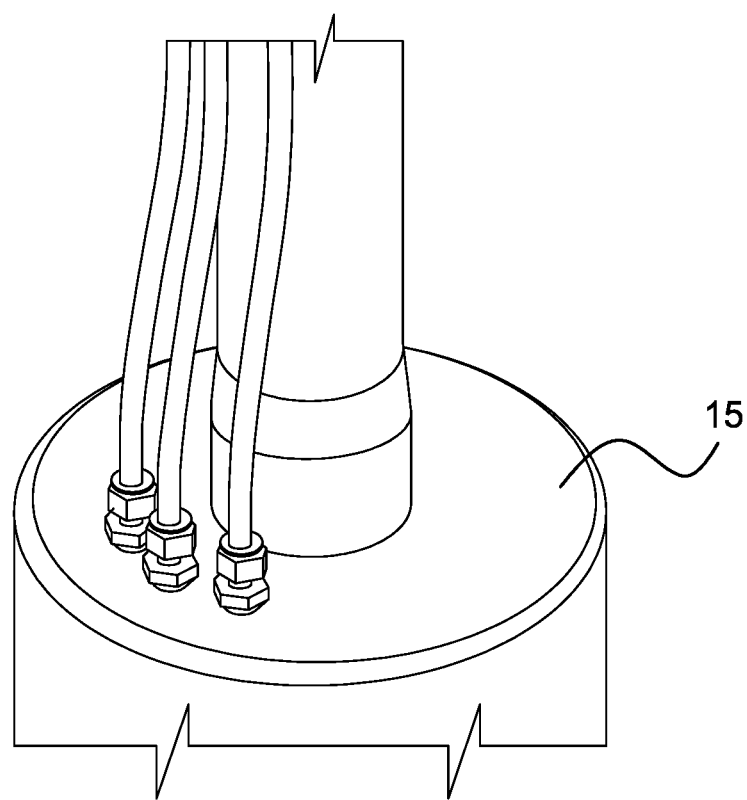
FIG. 6 is a partial schematic view of a well-insulation device included in a particular embodiment of the completion and production plant according to the present invention.
Figure 7:
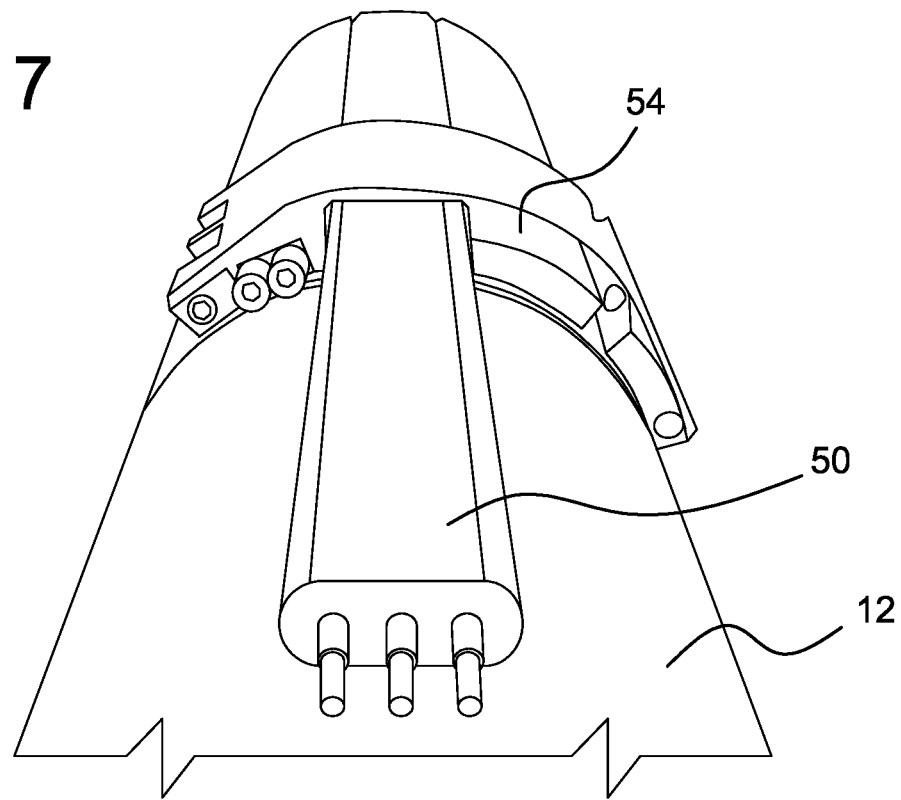
FIG. 7 is a partial schematic view of a power and data transmission cable included in a particular embodiment of the completion and production plant according to the present invention applied to a pipe.

As can be observed in FIG. 3a, a layer of elastomeric material 46 wraps the third longitudinal portion 44 and is arranged to pass from a rest condition in which it has a predetermined initial outer diameter to an activation condition in which it has an outer diameter greater than the initial outer diameter, following contact with the formation fluids and/or with the completion fluids. Activation of the layer of elastomeric material 46 can, then take place both before and after the displacement of the completion fluids according to a design choice.

An electrode 47 is advantageously wound on the layer of elastomeric material 46 and it is adapted to operate as an electric field source when it is electrically powered and as an electric field receiver when it is not electrically powered. In this way, when the layer of elastomeric material 46 comes in contact with the formation fluids and/or with the completion fluids, it swells bringing the electrode 47 in contact with the formation, to allow the electric field to propagate inside the reservoir when the electrode 47 operates as an electric field source and the electrical field propagated through the reservoir to be received when the electrode 47 operates as a receiver.

Each transceiver device 40 further comprises a peripheral electronic control unit 48 associated with the tubular body 41 connected to the electrode 47 and to the coil 45 to drive their electrical power supply. Advantageously, the monitoring and mapping system, according to the present invention, further comprises a central electronic control and data acquisition unit 60 associated with the transceiver devices 40 so that they can be electrically powered and configured for driving the peripheral electronic control units 48 so as to selectively power the electrodes 47 and the coils 45 so that they can operate alternately as sources or receivers according to a predetermined protocol.

In detail, the central electronic control and data acquisition unit 60 is configured for driving the transceiver devices 40 so that from an electrical point of view they behave like a transmitting electrical dipole and a receiving electrical dipole and from the magnetic point of view as a magnetic source and a magnetometer. In practice, considering four transceiver devices 40 the central electronic control and data acquisition unit 60 commands the power supply to two electrodes 47 and to one coil 45 leaving the remaining two electrodes 47 and the remaining coil operate as a respectively electrical and magnetic receiver.

Preferably, each transceiver device 40 comprises a first tubular stop shell 49 coupled with the first longitudinal portion 42 so as to cover the coil 45 and a second tubular stop shell 52 coupled with the second longitudinal portion 43. In this case, one of said tubular stop shells 49, 52 comprises a space in which the peripheral electronic control unit 48 is housed.

Preferably, the monitoring and mapping system comprises a first power and data transmission cable 50 that connects the central electronic control and data acquisition unit 60 to the transceiver devices 40 connected to each other in series from the first power and data transmission cable 50.

In this case, preferably, each of the tubular stop shells 49, 52 has a duct 53 for the passage of the first power and data transmission cable 50.

The first power and data transmission cable 50 can for example be a multipolar cable.

The first power and data transmission cable 50, thus, is made to pass through the first tubular stop shell 49 where it is connected to the peripheral electronic control unit 48 to then continue towards the second tubular stop shell 52.

Preferably, in the segment between the two tubular stop shells 49, 52 the first power and data transmission cable advantageously passes below the layer of elastomeric material 46, in particular interposed between the outer surface of the tubular body 41 and such layer of elastomeric material 46.

Preferably, the tubular stop shells 49, 52 and said first and second longitudinal portions are provided with mutual coupling elements (not shown) arranged to align the ducts 53 with each other. These mutual coupling elements are of the "self-aligning" type.

The alignment of the ducts 53 for the first power and data transmission cable 50 make it possible to avoid potential torsions of the cable itself that could damage its integrity and functionality.

Preferably, the first power and data transmission cable 50 extends along the primary conveyor pipe 12 and it is protected from a succession of clamps 54.

Alternatively to the first power and data transmission cable 50, the transceiver devices 40 can be provided with power supply batteries and wireless transceiving means that allow the transmission of data from and/or to the surface.

In any case, each tubular stop shell 49, 52 can consist of two half-shells which positioned and constrained one above the other constitute the shell itself. Said tubular stop shells 49, 52 can be made of composite material.

The composite material consists, for example, of epoxy resins with reinforcements made of Kevlar and hard materials for abrasion.

The tubular stop shells 49, 52 serve the purpose of keep in place the coil 45, the layer of elastomeric material 46 and the electrode 47. Moreover, said tubular stop shells 49, 52 act as centraliser elements, assuring that the casing pipe 12 is centred with respect to the hole of the well 20.

The tubular stop shells 49, 52 can be externally coated with zirconium to reduce the friction factor and at the same time to provide high resistance to wear.

Preferably, the layer of elastomeric material 46 has an initial outer diameter that is smaller than the outer diameter of the tubular stop shells 49, 52.

Preferably, the electrode 47 is an elastic conductive mesh fit on the layer of elastomeric material 46.

Preferably, the central electronic control and data acquisition unit 60 is housed in a compartment of a tubular protection shell 61 applicable to a pipe. In particular, the tubular protection shell 61 is advantageously applied to a completion and production plant 10 of the open hole type. In this case, in fact, the tubular protection shell 61 can be installed above or below the well-insulation device 15; in the first case, the well-insulation device 15 has a duct for the passage of the first power and data transmission cable 50.

From the above description the features of the monitoring and mapping system and of the completion and production plant object of the present invention, as well as the advantages thereof, are clear.

The monitoring and mapping system according to the present invention allows to carry out measurements of electromagnetic fields in the reservoir continuously, or at predetermined time intervals, and in real time during the production/injection of the well allowing to determine the distribution of specific properties, such as electrical resistivity, which can be correlated to the movement of the formation fluids, with an investigation radius that can change from metric scale to distances of hundreds of meters from the axis of the well and a resolution that will depend on the geological context, on the distance from the well and on the acquisition geometries used.

The aforesaid advantages are obtainable as a result of the following features:
 1—permanent installation of the monitoring and mapping system in the well;
 2—measurement of electrical potentials (DC Tomography) that can be processed in very short times (minutes);
 3—high sensitivity of the electrical field in the presence of strong contrasts in resistivity;
 4—high redundancy of the measurements (multi-channel system);

Lastly, it is clear that the monitoring and mapping system and the completion and production plant thus conceived are susceptible to numerous modifications and variants, all falling within the invention; moreover, all details can be replaced with technically equivalent elements. In practice, the materials used, as well as their dimensions, can be of any type according to the technical requirements.

The invention claimed is:

1. A monitoring and mapping system for monitoring and mapping a space-time distribution of formation fluids in a reservoir, said monitoring and mapping system being adapted to be applied to a completion and production plant for a well for extracting formation fluids, and said monitoring and mapping system comprising:
   at least four transceiver devices arranged to be applied at predefined distances from each other along a well casing pipe, each of said at least four transceiver devices comprising:
      a tubular body arranged to be put on said well casing pipe, said tubular body having a first longitudinal portion at a first end, a second longitudinal portion at a second end opposite to said first end, and a third longitudinal portion interposed between said first and second longitudinal portions;
      a coil wound on said first longitudinal portion and adapted to operate as a magnetic field source when said coil is electrically powered and as a magnetic field receiver when said coil is not electrically powered;
      a layer of elastomeric material which envelops said third longitudinal portion and which is arranged to pass from a rest condition in which said layer of elastomeric material has a predetermined initial outer diameter to an activation condition in which said layer of elastomeric material has an outer diameter greater than said predetermined initial outer diameter, following contact with the formation fluids and/or completion fluids;
      an electrode wound on said layer of elastomeric material and adapted to operate as an electric field source when said electrode is electrically powered and as an electric field receiver when said electrode is not electrically powered; and
      a peripheral electronic control unit associated with said tubular body and connected to said coil and to said electrode so that said peripheral electronic control unit is adapted to control a power supply of said coil and said electrode; and
   a central electronic control and data acquisition unit associated with said at least four transceiver devices so that said at least four transceiver devices are adapted to be electrically powered, and configured for controlling said peripheral electronic control units so as to selectively power said electrode and said coil of each of said at least four transceiver devices so that said electrode and said coil of each of said at least four transceiver device operate alternately as sources or receivers according to a predetermined protocol.

2. The monitoring and mapping system according to claim 1, wherein each of said at least four transceiver devices comprises:
   a first tubular stop shell coupled with said first longitudinal portion so as to cover said coil; and
   a second tubular stop shell coupled with said second longitudinal portion,
   wherein one of said first and second tubular stop shells comprises a compartment in which said peripheral electronic control unit is housed.

3. The monitoring and mapping system according to claim 2, wherein said layer of elastomeric material has an initial outer diameter smaller than an outer diameter of said first and second tubular stop shells.

4. The monitoring and mapping system according to claim 2, further comprising a first power and data transmission cable which connects said central electronic control and data acquisition unit to said at least four transceiver devices,
   wherein said at least four transceiver devices are connected to each other in series.

5. The monitoring and mapping system according to claim 4, wherein each of said first and second tubular stop shells has a duct for passage of said first power and data transmission cable.

6. The monitoring and mapping system according to claim 5, wherein, in a section between said first and second tubular stop shells, said first power and data transmission cable passes beneath said layer of elastomeric material such that said first power and data transmission cable is interposed between said layer of elastomeric material and an outer surface of said tubular body.

7. The monitoring and mapping system according to claim 5, wherein said first and second tubular stop shells and said first and second longitudinal portions are provided with reciprocal coupling elements arranged to align said ducts with each other.

8. The monitoring and mapping system according to claim 1, wherein said layer of elastomeric material is coated with a film adapted to dissolve following contact with a predetermined substance so as to control said activation condition of said layer of elastomeric material.

9. The monitoring and mapping system according to claim 1, wherein said electrode is a deformable conductive mesh fitted on said layer of elastomeric material.

10. The monitoring and mapping system according to claim 1, wherein said central electronic control and data acquisition unit is housed in a compartment of a tubular protection shell applicable to a tube, said central electronic control and data acquisition unit being configured for being electrically powered and for transmitting data to the surface by a second power and data transmission cable.

11. The completion and production plant to which the monitoring and mapping system according to claim 1 is adapted to be applied, said completion and production plant comprising:
    a lower section which at least partially extends into said reservoir and an upper section which extends above said lower section up to the surface;
    a primary conveyor pipe which faces and at least partially extends into said reservoir and a production pipe;
    a well-insulation device positioned between said upper section and said lower section; and
    said monitoring and mapping system.

12. The completion and production plant according to claim 11, wherein said central electronic control and data acquisition unit is housed in a compartment of a tubular protection shell applicable to a tube, said central electronic control and data acquisition unit being configured for being electrically powered and for transmitting data to the surface by a second power and data transmission cable, and
    said tubular protection shell is positioned above said well-insulation device, said well-insulation device being provided with a duct for passage of said first power and data transmission cable.

13. The completion and production plant according to claim 12, wherein said tubular protection shell is positioned below said well-insulation device.

14. The completion and production plant according to claim 11, wherein said first power and data transmission cable extends along said casing pipe and is protected by a succession of clamps.

* * * * *